United States Patent
Perkins

(10) Patent No.: US 8,990,424 B2
(45) Date of Patent: Mar. 24, 2015

(54) NETWORK ADDRESS TRANSLATION BASED ON RECORDED APPLICATION STATE

(75) Inventor: Charles E. Perkins, Saratoga, CA (US)

(73) Assignee: WiChorus, Inc., Santa Clara, CA (US)

(*) Notice: Subject to any disclaimer, the term of this patent is extended or adjusted under 35 U.S.C. 154(b) by 452 days.

(21) Appl. No.: 13/012,523

(22) Filed: Jan. 24, 2011

(65) Prior Publication Data

US 2011/0185085 A1 Jul. 28, 2011

Related U.S. Application Data

(63) Continuation-in-part of application No. 12/877,989, filed on Sep. 8, 2010, now abandoned.

(60) Provisional application No. 61/276,109, filed on Sep. 8, 2009.

(51) Int. Cl.
*G06F 15/16* (2006.01)
*H04L 29/12* (2006.01)
*H04L 12/801* (2013.01)
*H04L 12/851* (2013.01)

(52) U.S. Cl.
CPC ...... *H04L 61/2514* (2013.01); *H04L 29/12066* (2013.01); *H04L 29/12367* (2013.01); *H04L 29/1249* (2013.01); *H04L 61/1511* (2013.01); *H04L 61/256* (2013.01); *H04L 47/19* (2013.01); *H04L 47/2483* (2013.01)
USPC .......... 709/245; 709/238; 370/389; 370/392; 370/467; 455/434; 726/1

(58) Field of Classification Search
CPC ..................... H04L 29/12066; H04L 61/1511; H04L 29/12009
USPC .................. 709/245, 238; 370/389, 392, 467; 455/434; 726/1

See application file for complete search history.

(56) References Cited

U.S. PATENT DOCUMENTS

| | | | |
|---|---|---|---|
| 7,602,785 B2 * | 10/2009 | Dharmapurikar et al. ..... | 370/392 |
| 8,130,768 B1 | 3/2012 | Ahrens et al. | |
| 8,190,763 B2 | 5/2012 | Savoor et al. | |
| 8,239,751 B1 * | 8/2012 | Rochelle et al. .............. | 715/220 |
| 8,339,959 B1 | 12/2012 | Moisand et al. | |
| 8,363,650 B2 | 1/2013 | Rao et al. | |
| 8,601,567 B2 | 12/2013 | Spatscheck et al. | |
| 2003/0092442 A1 * | 5/2003 | Dalal et al. .................... | 455/434 |

(Continued)

*Primary Examiner* — Michael C Lai
(74) *Attorney, Agent, or Firm* — Hamilton, Brook, Smith & Reynolds, P.C.

(57) ABSTRACT

A method and system for improved NAT operation enable efficient translation for packets destined for communication systems within a domain utilizing network addresses that are incompatible with source and destination addresses indicated in packets delivered from the global Internet. Since the addresses are not compatible with global Internet addresses, delivery cannot be accomplished except by some method of address translation. Traditional systems have not been constructed to enable such inbound translations, providing, instead, only communication outbound from the incompatibly addressed domain towards the global Internet. Embodiments may employ application-specific knowledge for peer-to-peer based applications, associated over time with specific destinations. Embodiments may further employ an application-specific state machine in the NAT function to trace the development of the application protocol so that the resource identifier can be observed.

34 Claims, 7 Drawing Sheets

(56) References Cited

U.S. PATENT DOCUMENTS

| | | | |
|---|---|---|---|
| 2003/0236913 A1* | 12/2003 | Hoban et al. | 709/238 |
| 2004/0076180 A1* | 4/2004 | Satapati et al. | 370/467 |
| 2005/0152298 A1* | 7/2005 | Thubert et al. | 370/312 |
| 2006/0259625 A1* | 11/2006 | Landfeldt et al. | 709/227 |
| 2006/0274749 A1* | 12/2006 | Beier | 370/389 |
| 2008/0307081 A1* | 12/2008 | Dobbins et al. | 709/223 |
| 2009/0100169 A1* | 4/2009 | Allen et al. | 709/224 |
| 2011/0004932 A1 | 1/2011 | Spatscheck et al. | |
| 2011/0182183 A1 | 7/2011 | Perkins | |
| 2011/0182290 A1 | 7/2011 | Perkins | |
| 2011/0202679 A1* | 8/2011 | Cohen et al. | 709/238 |
| 2012/0033664 A1 | 2/2012 | Pignataro et al. | |
| 2012/0240185 A1* | 9/2012 | Kapoor et al. | 726/1 |
| 2012/0243547 A1 | 9/2012 | Pardo-Blazquez et al. | |
| 2014/0053239 A1* | 2/2014 | Narayanaswamy | 726/1 |

\* cited by examiner

NETWORK ADDRESS TRANSLATION BASED ON RECORDED APPLICATION STATE

RELATED APPLICATIONS

This application is a continuation-in-part of U.S. application Ser. No. 12/877,989, filed Sep. 8, 2010, now abandoned which claims the benefit of U.S. Provisional Application No. 61/276,109, filed on Sep. 8, 2009. The entire teachings of both of the above-referenced Applications are incorporated herein by reference. The teachings of all patents, published applications, and references cited herein are incorporated by reference in their entirety.

BACKGROUND OF THE INVENTION

As the Internet has evolved, the number of network-layer protocol addresses ($2^{32}$) has proved to be insufficient for maintaining full connectivity between the continually growing number of network devices attached to the Internet. For this reason, a new network-layer protocol, known as IPv6, has been designed to replace the currently deployed network-layer protocol, known as IPv4. The numbers 6 and 4 refer to the version numbers of the two protocols, respectively. IPv6 makes astronomically more network-layer addresses available for Internet devices ($2^{128}$, in fact). See, e.g., Internet Engineering Task Force (IETF) Request for Comments (RFC) 2373 and RFC 2460.

SUMMARY OF THE INVENTION

An embodiment of the present invention is a method, or corresponding apparatus, for performing network address translation. The embodiment maintains records about certain fields of traffic packets with incoming payloads associated with a flow in which flow translation in a network address translation (NAT) device has been initialized. The embodiment also uses at least a subset of the records to disambiguate traffic packets including a resource identifier determined to be associated with the records.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
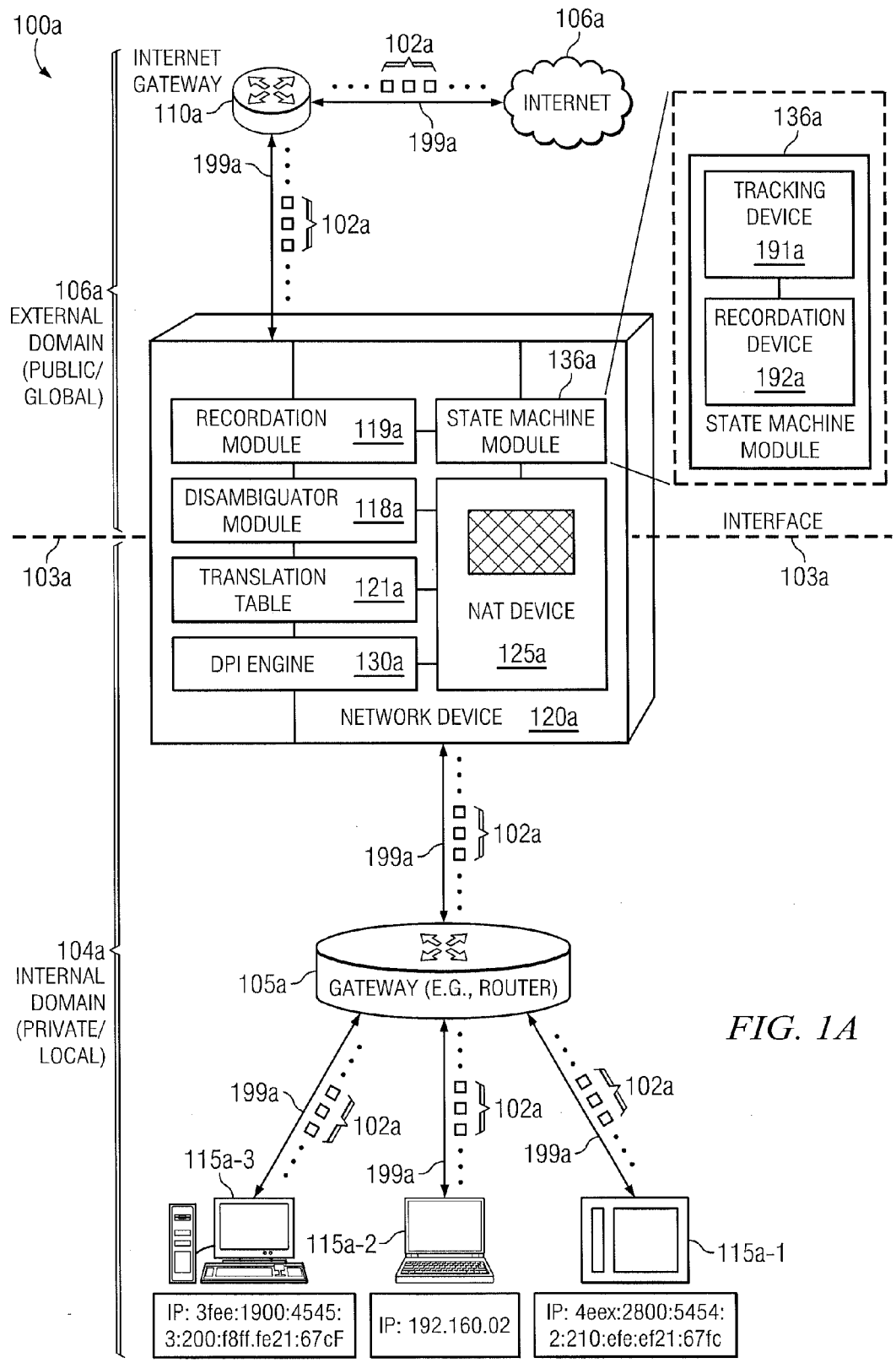
FIG. 1A is a network diagram of an example embodiment of the invention that illustrates operably interconnected network elements.

A description of example embodiments of the invention follows.

Example embodiments of the present invention include methods, apparatuses, and computer program products for network address translation employing deep packet inspection at a boundary between an external domain network with global addresses (e.g., the Internet) and an internal domain network with local address (e.g., a customer network). Although motivated by an impending need to support more addresses than Internet Protocol version 4 (IPv4) can handle given the growth in popularity of network devices, which gave rise to Internet Protocol version 6 (IPv6), as described immediately below, embodiments of the present invention more generally apply to any networks, now existing or hereinafter developed, having local and global addresses or an internal domain and external domain. Before describing embodiments of the present invention, a description of history and current developments of networking is presented.

An alternative method to the new network-layer protocol (i.e., IPv6) has been deployed, which is known as "network address translation," or NAT, and is often considered a temporary measure. Today, the access routers found in most households and business offices use NAT to enlarge the number of IPv4 addresses available to the computers attached to the household or business network, which may be referred to as "customer premises networks" or CPNs. NAT works by changing the IPv4 address given by the Internet Service Provider (ISP) into some other IPv4 address that belongs to a device connected to a CPN. This translated address is at the same time accessible by an access router (i.e., customer premises equipment, or CPE) connecting the ISP to the CPN. See RFC 2663. In most cases, the translated address, which identifies the device on the CPN, is also a private address. See RFC 1918.

Since the introduction of IPv6, various strategies have been proposed to help with the transition from IPv4 to IPv6. In the meantime, the widespread deployment of network address translators (NATs or NAT devices) for most customers has extended the lifetime of IPv4 so that there has not been as much immediate pressure for the adoption of IPv6. This is because the RFC 1918 private addresses consumed on the CPN are not required to be unique, and, thus, the same address space can be re-used many times.

Nevertheless, the IPv4 address allocation continues steadily, and the entire IPv4 address space will be depleted in the year 2011, or soon thereafter, at the latest. This means that there is still a very significant economic incentive towards making the long-delayed transition to IPv6, even though for most existing customers using RFC 1918 private addresses the effects are not noticeable. Much of the negative effect of IPv4 address depletion will be shouldered by new businesses, which may no longer be able to acquire an appropriate IPv4 address from their service providers. The details of managing CPE with NAT and private address space are the subject of a lively debate within the IETF and the Internet at large. See RFC 3424 for details.

When a device attached to a CPN has a private address, that device's IPv4 address can typically no longer be made available to the global Internet by way of a Domain Name System (DNS). The device can initiate outbound communications to a partner accessible at a globally unique Internet address, because that does not require the device's IPv4 address to be registered in the global DNS. Once the device's communications partner receives the initial packets sent by the device, a bidirectional communications stream can be maintained.

When the CPE (e.g., the access router with NAT functionality) translates the device's private address into the CPE's public address (as assigned by the ISP), it also typically allocates a new port number for the device. The CPE changes the device's outgoing data packets by translating the source IPv4 address and source port to be the CPE's IPv4 address (i.e., the IPv4 address of the NAT device) and the newly allocated source port. The new port is used to identify which CPN device should receive inbound packets from the newly initiated communication stream. Thus, the CPE creates an association between the device's private IPv4 address and a port number that is expected to be found in all inbound packets destined for that device. This association is maintained in a set of translation registers or tables that may be consulted for all inbound traffic from the global Internet.

Most such CPEs do not enable contact to the privately addressed devices to be initiated by other computers not on the CPN. Thus, NAT restricts the devices to run only "outbound" applications like web browsing, sending e-mail, and making outbound telephone calls. Such privately addressed devices cannot easily host servers or websites for the outside global Internet, and without further arrangements, these devices cannot receive telephone calls. Receiving e-mail has to be accomplished by initiating contact with an external mail server, which must passively store e-mail files until the privately addressed device initiates another e-mail client session. Thus, "push" services are more difficult for devices situated behind NAT devices.

Similar techniques used by CPEs to provide private addresses to devices on a CPN can also be used to connect IPv6 to the global IPv4 Internet, by way of the IPv4 address provided by the ISP. Using IPv6, there is no need for the CPN addresses to be re-used for multiple CPNs; put another way, IPv6 easily enables the availability of globally unique network-layer addresses. These globally unique addresses cannot typically be used to establish network communications with existing Internet websites that only understand version 4 of the Internet Protocol (i.e., the protocol that makes use of the IPv4 network-layer addresses). However, since the CPE translates the IPv6 device address into the IPv4 address assigned to the CPE router, the CPE enables the use of IPv6 for customer premises devices to work with the existing IPv4 Internet, just as it enables devices with private IPv4 addresses to use the global Internet.

Usually, before communications are initiated between two computers, such as devices with internetwork access capabilities on a global data communications system (e.g., the Internet), the initiating partner has to consult a DNS server to find the network-layer address of the desired destination partner. For this case, referred to as source Internet protocol NAT (SIPNAT), the destination computer must have its network-layer address registered with DNS server, even though there is no such requirement for the initiating computer. The initiating computer sends a DNS server query, which is often handled by several DNS servers cooperating to give access to all the Internet Protocol (IP) addresses that have been registered anywhere in the DNS server serving the global Internet. The query eventually arrives at the DNS server maintained for use by the CPE, which, for purposes of illustrating example embodiments of the present invention, will provide the IP address for some device on the CPN. This IP address is forwarded back to the initiating computer by way of a DNS server reply packet; IPv4 address information is contained within a "record" supplied as part of the DNS server reply. See RFC 1035.

Previous techniques (e.g., SIPNAT, IVI, etc.) have been proposed for facilitating the translation of packets from the Internet into the IPv6 or privately addressed domain. IVI has the defect of generally requiring static allocation of a global network interface for each internal destination. A DNS-based procedure is used by the SIPNAT proposal; this works well in most cases, but there are situations in which variations in the deployed behavior of the DNS server can introduce ambiguities into the results obtained by use of SIPNAT.

It has been observed that many network-based applications exchange data, which can in some way be used to characterize or identify the recipient. For instance, applications often negotiate a unique resource identifier, which the application can use as an index into a local resource database; this is particularly true for multithreaded server applications. Of course, the association between the resource identifier and the destination may be far less transparent than the association between the destination and the IP address assigned to the destination.

Before describing in detail example embodiments that are in accordance with the present invention, it should be observed that example embodiments of the present invention reside primarily in combinations of methods or apparatus components related to method and system for communicating a plurality of packets between the customer premises and computers available by way of the global Internet. Accordingly, the methods or apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. In addition, although the terms "traffic packet," "state machine" and "deep packet inspection" are being used, the terms are for convenience and other forms of communications signaling, operation procedures, and inspection thereof, such as traffic frames, data signals, and the like, are contemplated to be within the scope of the present invention.

Example embodiments of the invention improve the operation of network address translators (NATs), network address translation devices (NAT devices), or network address translation boxes (NAT boxes), which are commonly employed for managing the forwarding interface between two computer networks that have incompatible addressing methodologies for the network layer addressability of the devices in the two networks. It should be understood that "NATs," "NAT devices," and "NAT boxes" are used interchangeably herein and may be in the form of hardware, firmware, software, or known or hereinafter developed combinations thereof.

One example embodiment of the present invention uses techniques from SIPNAT to set up an association between external and internal domain address or port-based flow translation, and then uses application-specific methods to discover a resource identifier. External domain, as used herein, can be associated with a global Internet address, client-side address, or public address; an internal domain can be associated with a local network address or private address. Once the discovered resource identifier has been recorded, it can be used to disambiguate any remaining decisions that may be caused by DNS server anomalies or strategies for averting Denial of Service attacks.

Example embodiments described herein enable computers, such as client-side devices, on the global Internet to initiate contact to devices connected to the CPN behind a NAT device function, with either IPv4 or IPv6 network-layer addresses. In one such example embodiment, when a packet arrives at the CPE, the access router employs its knowledge of a source port or flow translation that has been associated with the device connected to the CPN. In other words, various embodiments of the invention provide methods and systems for enabling computers on the global Internet to initiate contact to devices connected to the CPN behind a NAT device, with either IPv4 or IPv6 network-layer addresses.

Alternative example embodiments of the present invention can use SIPNAT and employ DPI to establish address/port flow translation from a source to a destination behind a NAT device.

Additional example embodiments of the present invention can allow for external domains with an IPv4 network addresses to initiate and maintain communications with internal domains with IPv6 network addresses without the NAT device having knowledge of the destination port number or having the communication already initiated. In one such example embodiment, the source IP address of a traffic packet can be used, for example, to select or determine the IPv6 destination address. Further example embodiments of the present invention may use the source port number to determine the IPv6 destination in order to exercise finer control in determining or selecting the destination.

In further alternative example embodiments of the present invention, bidirectional NAT can be employed for communications between an external domain and an internal domain (e.g., communications between an IPv4 network address and an IPv6 network address) using a DNS server. In one such example embodiment, the bidirectional communication does not require changes to either an IPv6-only host or router or an IPv4-only host or router. Additional advantages of one such example embodiment include an ability to delegate special or specified domains to the NAT device, no requirement or need to establish point-to-point tunnels (tunneling) or use of tunneling protocols in order to carry IPv6 packets over an IPv4 routing infrastructure, and no requirement for Dual IP layer (dual-stack) implementations or protocols in order to provide support for both IPv4 and IPv6 in hosts and routers. Some such example embodiments can model the communications in a manner similar to flow management, including multiple parameters, such a 5-tuple parameter including for an incoming flow, for example, the IPv4 destination address, the source port number, the NAT device address, the destination port number, and a type of service (TOS) parameter, which can be mapped or managed to an outgoing flow including 5-tuple parameters, such as an IPv4 map, a source port number, an IPv6 dev, a destination port number, and a TOS parameter.

Such example embodiments can run at line speeds by employing flow management, and such modeling can further provide for scalability and understanding of flow records. Alternative example embodiments of the present invention allow for a scalable approach by allowing each IPv4 addressed used by the incoming flows to be shared by multiple different IPv6-only devices. The degree of scalability of such an approach can vary on multiple factors; for example, scalability may be determined by the rate of arrival for new incoming connection requests or by the number of connection requests initiated from a particular IPv4 host.

It should be understood that IPv4 and IPv6 are merely examples of legacy and upgraded versions of communications protocols; embodiments of the invention can also be applied to other communications protocols. For convenience, embodiments of the invention are described relative to IPv4 and IPv6.

FIG. 1A is a high-level network diagram of an example embodiment of the invention that illustrates a communications internetwork 100a. The internetwork 100a can be any network or combination of networks, such as a global Internet 106a operably interconnected to a local network 104a, and can include a plurality of network elements, such as end user devices 115a(1-3), gateway 105, network device 120a, Internet gateway 110a, or other network elements currently known or future developed. In alternative example embodiments, the network device 120a can connect directly to the Internet 106a or other public networks (not shown) without the use of an intermediary network element, such as the Internet gateway 110a.

Example embodiments of the present invention can include network translation that works by translating a global Internet address (external domain address) to a local network address (internal domain address), and vice versa. Translation may also be used to translate one legacy communications protocol address, such as IPv4, into a different or updated communications protocol address, such as IPv6.

Example embodiments of the present invention provide for bidirectional communications using NAT while providing operational conveniences that will encourage the adoption of IPv6 by enabling IPv6-only devices to provide services to and communication with existing IPv4 devices. The specialized approaches provided by example embodiments of the present invention allow for forms of flow management where traffic flow through a NAT device is identified using source and destination IP address (and additional information if wanted) to allocate and deallocate resources for communication between IPv4 and IPv6 nodes.

Continuing to refer to the example embodiment of FIG. 1A, traffic 102a, originating at a source, such as an external domain 106a (also referred to herein as a global Internet, public domain, or client-side domain), may travel toward a destination, such as an internal domain 104a (also referred to herein as a local domain or private domain) via a medium, such as links 199a. The links 199a can be any one of or combination of wired links, optical links, wireless links, and the like. The entities communicate by exchanging traffic packets according to a pre-defined set of network protocols, such as the Transmission Control Protocol/Internet Protocol (TCP/IP), or other currently known or future developed communications protocols. The traffic 102a can be forwarded to a corresponding gateway 105a via the medium 199a. The gateway 105a can be any of a multitude of wireless or wired gateways, such as an Application Layer Gateway (ALG), Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway. In alternative example embodiments of the present invention, the gateway 105a can be any network node, such as a router, that can provider interoperability between networks using the same or different communications protocols. The gateway 105a can maintain, or be operably interconnected to, a network address translation (NAT) device 125a.

An example embodiment of the present invention further can include the NAT device 125a to perform network translation on the network address information included within a header of the traffic packet 102a by translating an internal (e.g., private) network address 140 to an external (e.g., global) network address 160a, and vice versa, relative to the NAT device 125a. The NAT device 125a can maintain records of translations in a translation table 121a, which can be accessible to a state machine determination module 136a, recordation module 119a, disambiguation module 118a, deep packet inspection (DPI) engine 130a, or other network elements as may be needed. Alternatively, the network device 120a in which the NAT device 125a can maintain the translation table that is shown in the embodiment of FIG. 1A, 121a. After the network address translation is complete, the traffic packet 102a is forwarded to its destination, such as any of the end user devices 115a-1 . . . 3.

Alternative example embodiments of the present invention can include the NAT device 125a, which can share a single external Internet Protocol (IP) network address, or a limited number of external IP network addresses, between a network of machines or elements. Specifically, example embodiments of the NAT device 125a can alter the IP header (not shown) of the traffic packet 102a as it flows from a source to a destination through the NAT device 125a, in which case the NAT device 125a can optionally change the source address of the IP traffic packet, destination address of the IP traffic packet, or both addresses as the NAT device 125a or network device 120a sends the traffic packet 102a on its way from source to destination. The NAT device 125a can maintain records of the flow of packets across the network device 120a.

In an example embodiment of the present invention, the network device 120a can contain or be interconnected operably to a state machine determination module 136a used, for example, to monitor step-by step process and operations of state machines for applications. The state machine determination module 136a can track application-specific operations, in a tracking device 191a, related to traffic flow and traffic packets through the NAT device. The information tracked can be recorded in a recordation device 192a or memory physically or logically interconnected or accessible to the state machine determination module 136a. Such records can include, for example, an initial state of an application or stored information related thereto; a set of possible input events; a set of new states that may result from the input; a set of possible actions or output events that result from a new state; or any additional information relating to the operating scheme of an application. The state machine determination module 136a can further be optionally interconnected with the disambiguator module 118a that can ascertain characteristics of inbound traffic packets to determine for a particular destination associated with the inbound traffic packets based on application-specific state machines. The disambiguator module 118a can further include or be interconnected operably to the recordation module 119a and/or to the memory device 117a.

Alternative example embodiments of the present invention may employ a system for monitoring or recording information pertaining to or derived from network-based applications that exchange data in a way that can be used to characterize or identify the recipient or destination. For instance, applications often negotiate a unique resource identifier that they can use as an index into a local resource database; this is particularly true for multithreaded server applications. Of course, the association between the resource identifier and the destination may be far less transparent than the association between the destination and the IP address assigned to the destination.

Further example embodiments of the present invention can monitor, record, and use information relating to applications that rely on a state machine or multiple state machines for their operation. The step-by-step operation of such state machines can be tracked and relevant host identifiers cached. When the NAT device of an example embodiment of the present invention detects the identifier for a particular destination, it can use that identifier to deliver the traffic packet. Such example embodiments of the present invention can use the state machines as deterministic methods to establish a destination for the traffic packet. Alternative example embodiments of the present invention include monitoring different applications with distinguishable states where each segment of a process of the application being represented by a different state. Depending on the results of each test of each state of a state machine, a different next state may be called and executed by the application. Such example embodiments may then employ application-specific state machines in the operation of network address translation to trace the development of the application protocol such that the resource identifier can be observed, recorded, and used for determining destinations of traffic packets.

In example embodiments of the present invention, application-specific data can be stored and/or used to disambiguate problematic deliveries that fail to reach the destination of the traffic packet, where a destination cannot otherwise be determined, or for other problematic situations currently known or hereinafter determined relating to packet forwarding using network address translation. In such example embodiments, the traffic packet header, payload, and/or fields of the payload can be inspected and recorded for instant or future operations to determine the destination of the traffic packet.

In alternative embodiments, after initial contact to the DNS server, by which the flow translation has been initialized, additional operations are employed to ensure delivery of a packet to its intended destination. In particular, the NAT "box" may be configured to keep detailed records about certain fields of incoming payloads. For deliveries that are unambiguously targeted to a specific destination, the algorithmically delimited fields of the payload are inspected and recorded for future operations. In particular, when resource handling by an application is known to the NAT box, and when that resource handling by the application results in making a resource identifier available, then the NAT box stores that resource identifier as tightly associated with the destination that is hosting the application. Then, when, at a later time, a payload containing the resource identifier arrives for disposition by the NAT box, the stored data about the selected resource identifier can be used to disambiguate problematic deliveries. In this way, the payload itself can be used to identify the destination computer.

Consequently, in example embodiments of the present invention, the destination computer can be properly determined based on the step-by-step operation of a monitored state machine and determining the relevant host identifiers that packets target at that destination, reducing the need for relying on the fields of the packet headers. The network-layer protocol headers of the incoming packets ensure arrival at the intended global NAT address, which will already have a proper flow translation enabled; however, with the additional information in the payload, the correct destination can be identified even when there may be some ambiguity due to overlapping flows at the same global NAT network interface address.

For example, peer-to-peer applications typically create a database of resource segments. When a communication peer requests delivery of the total resource, it is granted access to individual segments of the resource. Sometimes the remote peer only obtains a subset of all the segments, because other servers may have provided some of the data to reconstitute the total resource. While duplication is far from rare, it is not common—at least based on the evidence obtained by inspection of various available traces for peer-to-peer activity. The exact form of the resource identification and segment presentation varies from one peer-to-peer protocol to the next. The description herein is applicable to BitTorrent and related protocols. This already accounts for a huge proportion of the known Internet traffic for peer-to-peer networks. New applications may require adjusted techniques for collecting the resource identifiers, typically by new parsing algorithms and modified state machines to monitor the progress of the negotiation between the two peers for establishment of the resource transmission.

Figure 1B:
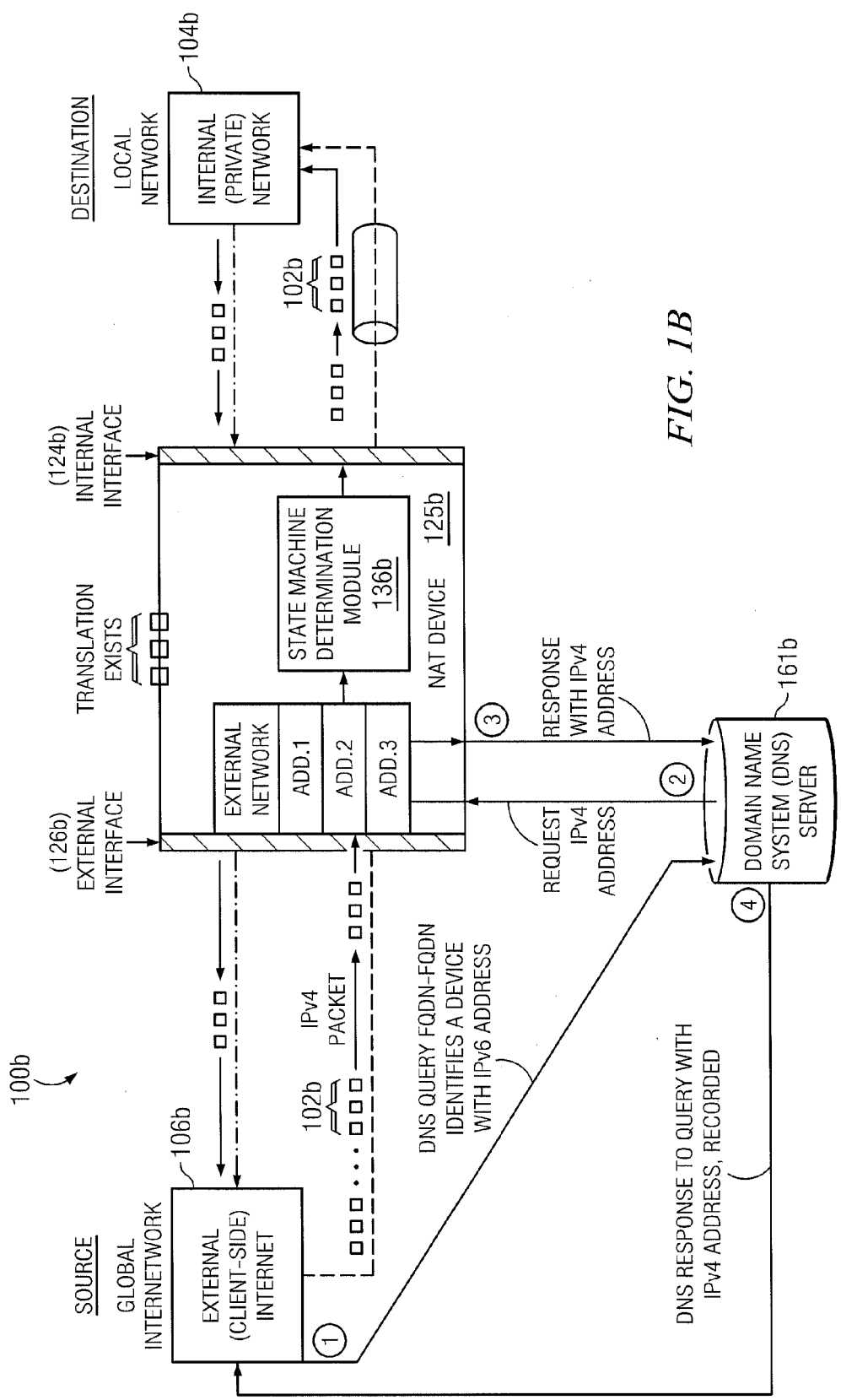
FIG. 1B is a network diagram of an example embodiment of the invention that illustrates operably interconnected network components to perform network address translation between a source and a destination.

FIG. 1B is a network diagram of an example embodiment of the invention that illustrates a communications internetwork 100b employing bi-directional source Internet Protocol network address translation (SIPNAT). The example network 100b illustrates a source, such as global internetwork 106b connected to a destination, such as local network 104b. The global internetwork 106b can be known as an external network, client-side network, or public network, any of which are used herein interchangeably. Additionally, the local network 104b can be known as an internal network or private network, also used herein interchangeably. The source 106b can be operably interconnected to the destination 104b via any communications interface or medium (e.g., an optical fiber, copper wire, or air interface), which is operably interconnected to a network address translation (NAT) device, which, for example, can be located at a network router or node.

Example embodiments of the present invention can employ SIPNAT to establish address/port flow translation by employing deep packet inspection of traffic packets in the flow, as described below. The example network 100b of FIG. 1B can enable a server to initiate contact with a client, and vice versa, without parameters for each flow having to be established by the internal network node. Using SIPNAT, an external domain 106b can query a domain name system (DNS) server 161b to establish or complete the required parameters (i.e., a source address for a traffic packet arriving at the NAT device, a destination address for a traffic packet arriving at the NAT device, a source address of the traffic being transmitted from the NAT device, and a destination address of the traffic being transmitted from the NAT device) for the flow translation, which is explained in detail below in reference to FIG. 3. The external domain 106 can send a DNS query for a fully qualified domain name (FQDN), where the FQDN can identify a device with an IPv6 address.

Continuing to refer to FIG. 1B, when the DNS 161b allocates an external (source) domain NAT address 160b on a NAT device 125b, the traffic flow is in a pending state because only three of the four addresses are known (i.e., the destination (internal) IP address for the packet, destination (internal) NAT IP address for the packet on the internal domain, and source (external) NAT IP address for the packet on the external domain). When the packet arrives at an external NAT interface 126b, if that packet does not match any existing, previously established, or pending flow being maintained at the external NAT interface 126b, then that packet is considered to establish the pending flow. The source (external) IP address of the incoming packet is used to finish the required quadruplet of addresses for that flow. In alternative example embodiments of the present invention, the NAT device 125b can be operably interconnected to a translation table (not shown), which can maintain IP addresses in order to map addresses to a single IP address and readdress the outgoing IP packet so the source IP address of the internal packet appears as the source IP address of the NAT device.

In order to complete a traffic flow, the NAT device, or other operably interconnected physical or logical element, determines the source address of all traffic flows pending at the external interface of the NAT device. If the determined source address has a pending flow, then the NAT IP address is established as the source address of the traffic packet, thereby completing the quadruplet information of the flow, which causes the flow to no longer be in a pending state. A completed flow may be forwarded to the destination of the traffic packet with the readdressed source IP address being the source NAT IP address.

In alternative example embodiments of the present invention, the DNS-based setup can provide IPv4 addresses for communication with an IPv6 device and use a source IP address to select or allocate the IPv6 destination. The example embodiment can further use the source port number to maintain and exercise finer control of traffic communications between the IPv4 and IPv6 addresses. The example embodiment further provides for bidirectional network address translation between external and internal domains using different or incompatible communications protocols. In the example embodiment employing bidirectional NAT using the DNS and SIPNAT, translation is simplified and does not have dual-stack requirements or tunneling or encapsulating of the IPv6 packets in IPv4 packets.

In further alternative example embodiments of the present invention, when a flow being maintained at the external interface 126b of the NAT device 125b is in a pending state, the pending address would be the address of the NAT device, which would cause the DNS server 161b not to provide the external domain address. When an address is in pending state on the NAT device 125b, that address cannot be used by the DNS server 161b for another flow until the pending flow is established and that address is no longer in the pending state. For a similar rationale, the NAT device translation table cannot maintain two traffic flows with the same source address because each source address is used by the NAT device to determine to which destination to forward the traffic packet. As such, in further alternative example embodiments of the present invention, the directionality of the traffic flow is useful because, when an application wants to transmit traffic to a destination in the network, the application looks to the DNS server for information.

In an embodiment of the invention, as time goes on, at least for the most popular resource servers, statistics are kept that indicate reliability of using the resource identifier (along with other information from the application packets exchanged) as a means for identifying the destination. In other words, each such resource identifier is recorded along with an indication about the degree of certainty of the actual destination. In most cases, the destination will, in fact, be known for certain. If it is discovered that the same resource identifier is reliably associated with two different destinations, then the identifier cannot be used as the sole determinant for delivering payloads to the destination, and an additional example embodiment of the present invention, such as one in which DPI can be employed to determine the destination. Nevertheless, the restricted set of destinations that are shown to host resources with the same resource identifiers can still be profitably used to disambiguate future deliveries. In alternative example embodiments of the present invention in which a destination is unknown or further determination is needed or useful, a state machine module 136b can be employed such that a destination computer can be properly determined based on the step-by-step operation of a monitored state machine.

In alternative example embodiments of the present invention, after the initial contact to the DNS server, by which the flow translation has been initialized, additional operations can be employed to ensure delivery of the traffic packet 102b to the proper destination. In particular, in one embodiment, the step-by-step operation of a state machine relied on by an application for its operation can be tracked and the relevant resource or host identifiers can be recorded or cached. In such example embodiments, if the NAT device determines the identifier for a particular destination, the NAT device can use that particular identifier to deliver the traffic packet.

Figure 2:
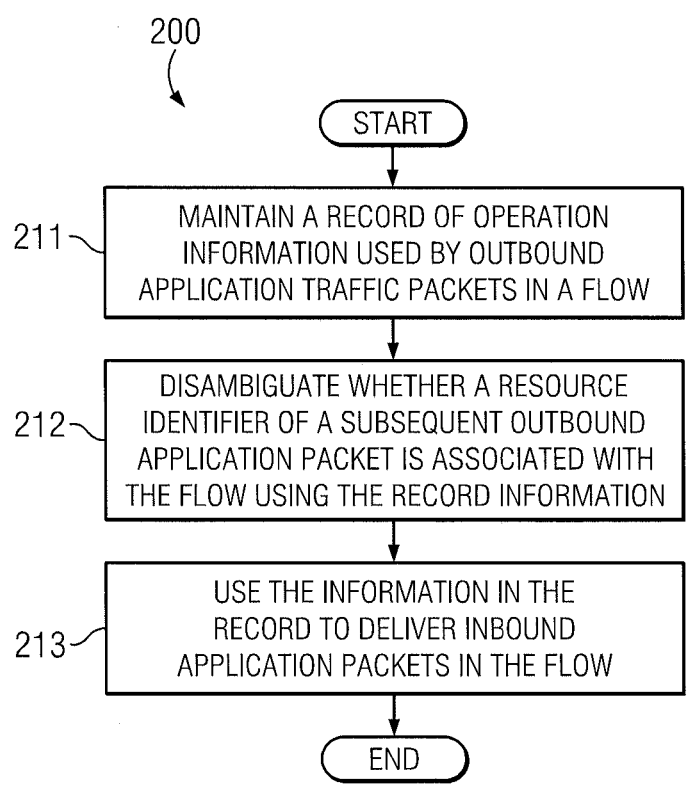
FIG. 2 is a flow chart of an embodiment of the present invention that illustrates functions involved in performing network address translation.

FIG. 2 is a flow chart 200 illustrating a method by which a network address translation (NAT) device, such as the NAT device 125a of FIG. 1A, can perform network address translation according to an example embodiment of the present invention. According to the example embodiment, the flow chart 200 employs tracking step-by-step operations used by an application to maintain a record of the operation information used by an outbound application traffic packet in a traffic flow (211). The record of operation can include, for example, a resource identifier associated with the outbound application traffic packets. The information contained or associated with the record can be used to disambiguate whether a resource identifier of a subsequent outbound application traffic packet is associated with the traffic flow (212). The flow chart 200 can further deliver an inbound application traffic packet in the flow to a particular next destination using information in the record (213).

Figure 3:
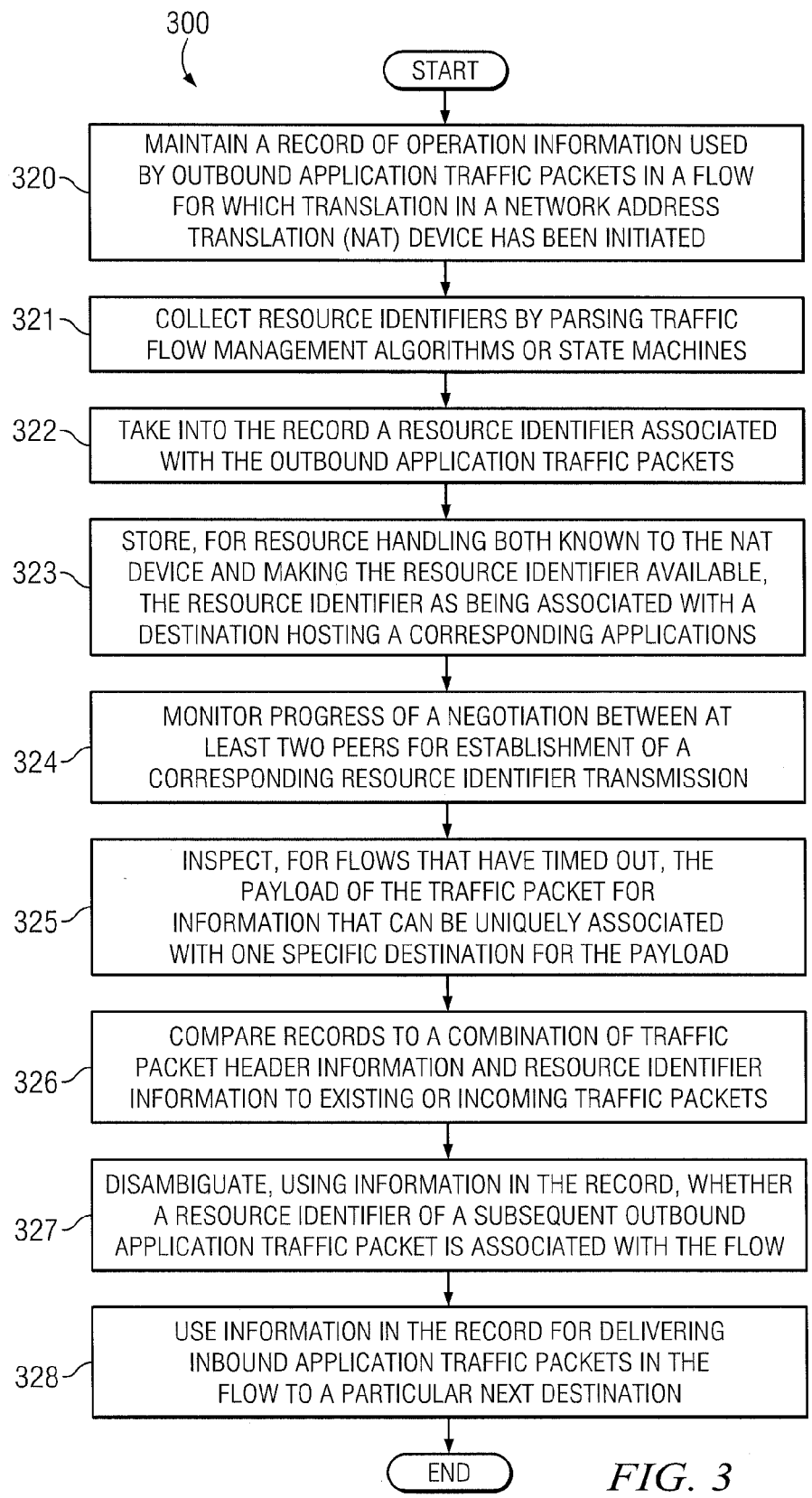
FIG. 3 is a flow diagram of an embodiment of the present invention that illustrates a method of network address translation based on application operations.

FIG. 3 is a flow diagram 300 of an embodiment of the present invention that illustrates a method of performing network address translation using application information to determine a destination address of traffic in a flow. The example embodiment can be performed in a network device, such as the network device 120a in FIG. 1A, or other network elements or sub-elements operably interconnected in a communication network, such as the network 100a of FIG. 1A.

In example embodiments of the present invention, flow diagram 300 can track step-by-step operations of state machines relied on by applications for their operation. All or some of the tracked operations can be stored, including information pertaining to host identifiers. If the NAT device locates a host identifier for a particular destination, embodiments of flow diagram 300 can use that previously cached host identifier to deliver traffic packets arriving at the NAT device.

After beginning, the example embodiment of operation procedure of FIG. 3 can maintain a record of operation information used by outbound application traffic packets in a flow for which translation in a network address translation (NAT) device has been initiated (320). The network device can collect resource identifiers by parsing traffic flow management algorithms or state machines relied on by applications (321). Resource identifiers found or determined to be associated with the outbound application traffic packets can be included and stored in the record (322). For resource handling both known to the NAT device and making the resource identifier available, the resource identifiers can be stored or recorded as being associated with a destination hosting corresponding applications (323). The flow diagram 300 can further monitor progress of a negotiation between at least two peers in a network or networks for establishment of a corresponding resource identifier transmission (324). The flow diagram 300 further provides for example embodiments of a method for inspecting, for flows that have timed out, the payload of the traffic packet for information that can be uniquely associated with one specific destination for the payload (325). Records of a combination of traffic packet header information and resource identifier information can be compared to existing or incoming traffic packets to help perform deterministic evaluations as to destinations of traffic packets (326). The flow diagram 300 can further disambiguate, using information in the record, whether a resource identifier of a subsequent outbound application traffic packet is associated with the flow (327) and use information in the record for delivering inbound application traffic packets in the flow to a particular next destination based on deterministic results (328).

Figure 4:
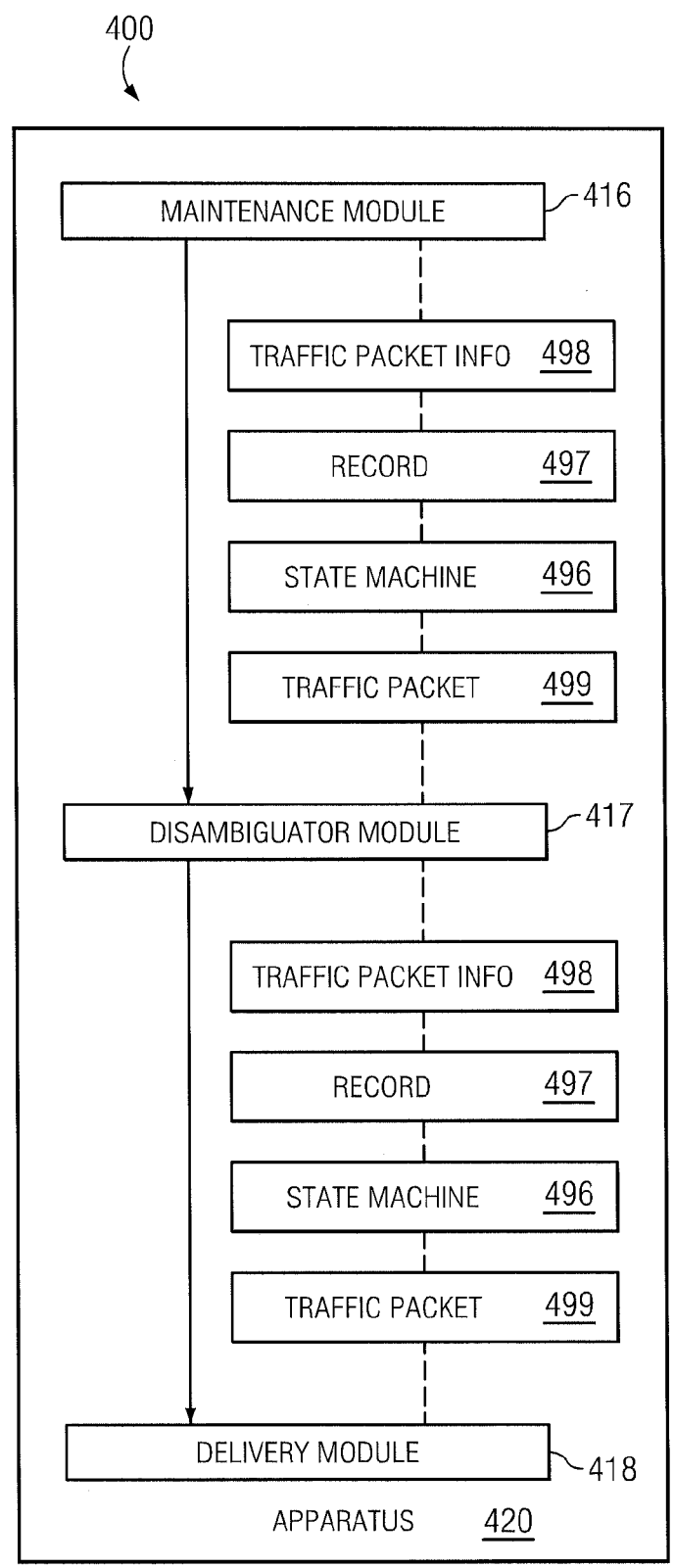
FIG. 4 is a block diagram of an embodiment of the present invention that illustrates components involved in performing network address translation employing deterministic association of destinations and application operations.

FIG. 4 is a block diagram 400 of a network apparatus 420, such as network device 120a of FIG. 1A, according to an example embodiment of the present invention. Components of the network apparatus 420 can include a maintenance module 416, a disambiguator module 417, and a delivery module 418. According to the example embodiment, the maintenance module 416 is configured, for example, to maintain a record of a field of at least one traffic packet that contains incoming payload associated with a flow of traffic initialized for network address translation (416). The incoming payload associated with the flow may be associated based on factors, such as source, destination, size, speed, application type, quality of service requirements, or other factors relevant to network address translation and application specific operations that are currently known or hereinafter determined to be so applicable.

The disambiguator module 417 can use information in the record to determine whether a resource identifier of a subsequent outbound application traffic packet is associated with a flow. The disambiguator module 417 can further determine if traffic packets arriving at the NAT device are destined for the same destination based on application-specific operations information stored by the maintenance module. Next, the delivery module 418 can use the information in the record, or information optionally determined or stored in an alternative location, such as a memory, for delivering inbound application traffic packets in the flow to a particular next destination.

Alternative example embodiments of the modules 416, 417, and 418 of block diagram 400 can be located at a network element or sub-element interconnected operably in a communication network. Further alternative embodiments of the present invention can include modules being in a system of any physical or logical configuration.

Figure 5:
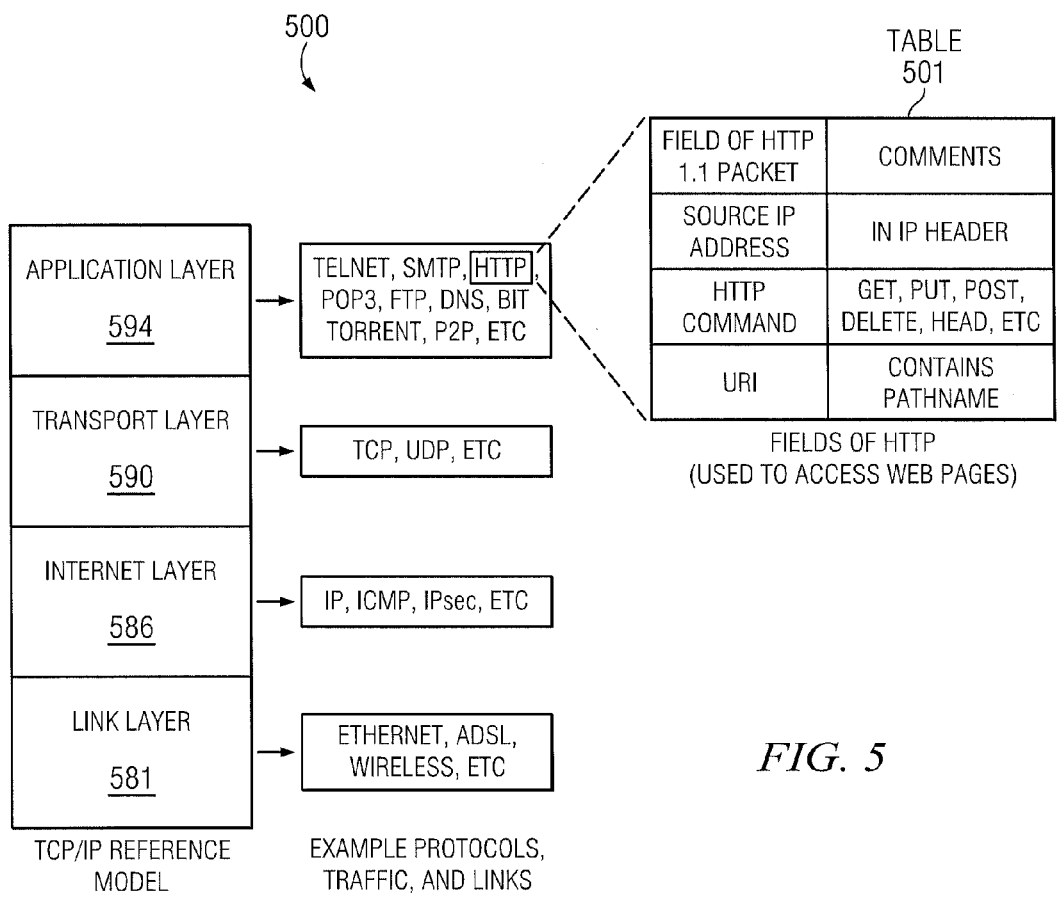
FIG. 5 is a diagram of an embodiment of the present invention that illustrates a TCP/IP reference model and application specific field information.

FIG. 5 is a diagram 500 of an embodiment of the present invention that illustrates components of a TCP/IP reference model 580. Deep packet inspection (DPI), as detailed above in reference to FIG. 1B, can inspect all layers of a traffic packet, including the payload of the packet which can exist at layers after the transport layer 590, such as the application layer 594 as described below. The TCP/IP reference model 580 is one type of model to view or divide a communications network into smaller categories, such as layers. Each layer of the TCP/IP reference model 580 can communicate with the layer directly above or directly below itself.

The bottom layer, the link layer 581, is logically closer to the physical transmission of data among elements or sub elements in a network, such as Media Access Control (e.g., Ethernet or DSL). The Internet layer 586 can, for example, allow for the routing and controlling of traffic between hosts, such as a source and destination pair. The transport layer 590 enables end-user traffic transfer; typical examples include transmission control protocol (TCP) or user datagram protocol (UDP). The top layer, the application layer 594, is logically closest to the user application and can interact with a software application (e.g., Telnet, Simple Mail Transfer Protocol (SMTP), Hypertext Transfer Protocol (HTTP), Post Office Protocol 3 (POP3), File Transfer Protocol (FTP), Domain Name System (DNS), BitTorrent client (BitTorrent), Peer-to-Peer (P2P) etc.) that an end-user employs via a user interface or other tools of the software application. A person of ordinary skill in the art would understand that each network layer described above includes a multitude of additional functions and capabilities, and the descriptions above are provided as a brief overview and not the totality of the TCP/IP reference model for purposes of providing context for the example embodiment illustrated in FIG. 5.

In an example embodiment of the present invention, a table 501 illustrates example fields of a typical application packet, specifically a Hypertext Transfer Protocol (HTTP) packet, which is used to fetch web pages on network nodes. Each fetch or access to a web page by the HTTP packet must contain a specific pathname that is valid on the remote computer that identifies the desired web page. In example embodiments that employ DPI to inspect the application traffic payload, such as the HTTP packet illustrated in table 501, the inspected payload can improve salability and robustness of the using known payload fields for certain applications and protocols. For example, the payload fields can provide or identify the destination for the traffic.

In alternative example embodiments of the present invention, other reference models, such as an OSI reference model, may be used to understand or program deep packet inspection modules. Alternative embodiments may also maintain deep packet inspection modules at any location or network element in a communications network, such as the network 100b in FIG. 1B or operably interconnected remote internetworks.

Figure 6:
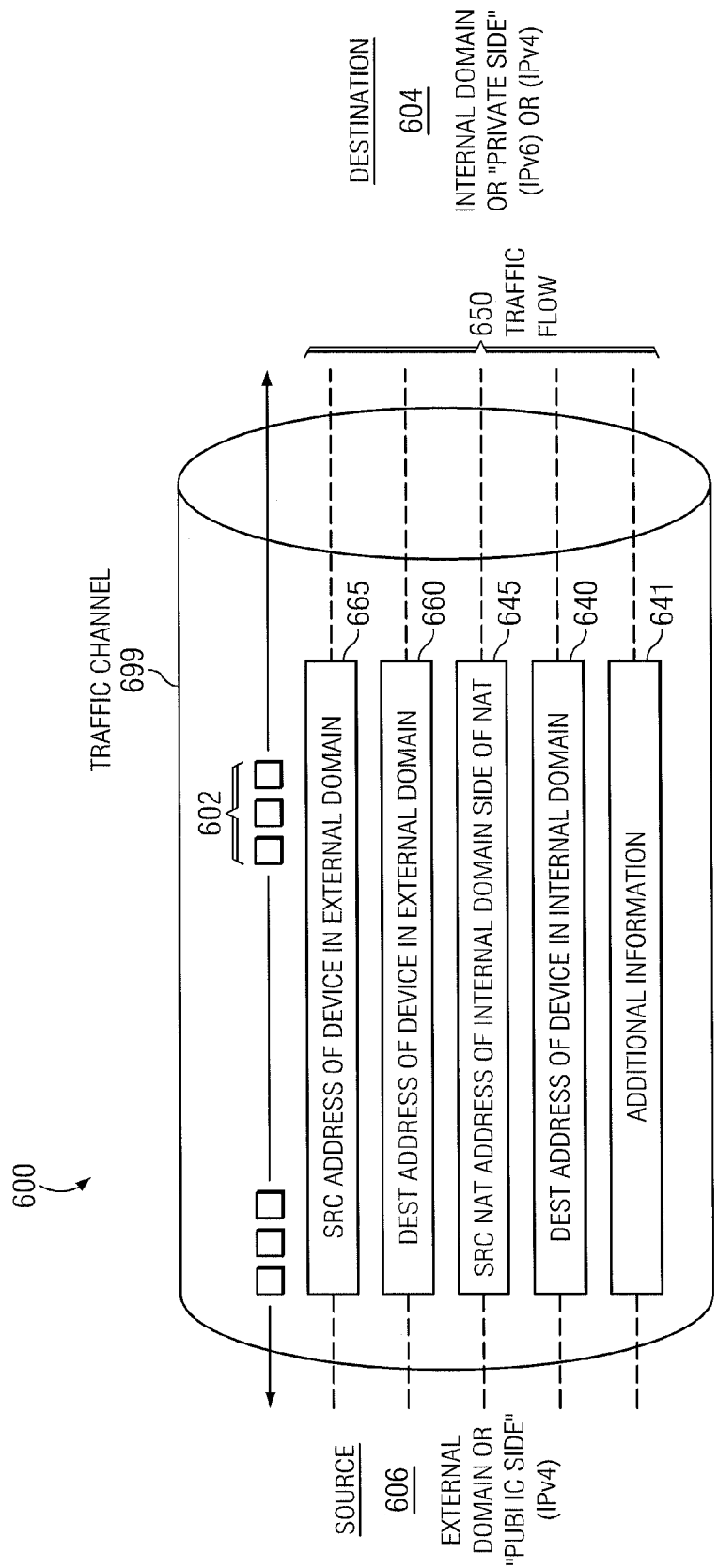
FIG. 6 is a diagram of an example embodiment of the present invention that illustrates communication between a source and destination in a network.

FIG. 6 is a diagram of an example embodiment of the present invention including a traffic channel 699 supporting various communications protocols, simultaneously, individually, time division multiplexed, or combinations thereof. For example, the traffic channel 699 can support traffic, including P2P traffic, voice over Internet Protocol (VoIP) traffic, FTP traffic, BitTorrent traffic, or other protocol and application traffic currently known or hereinafter developed. The traffic channel 699 can be supported by any embodiments of the invention disclosed herein, such as those example embodiments that employ deep packet inspection and related activities.

The traffic channel 699 can provide support for the communications via a traffic flow 650, where the traffic flow 650 is from a source 606 to a destination 604 in an internetwork. The source 606 can be any of an external domain of an internetwork, client side of an internetwork, public network, or hereinafter developed network. The destination 604 can be any of an internal network, private network, or hereinafter developed network. In alternative example embodiments of the present invention, the traffic flow 650 can contain additional information 641 about a traffic packet, or the traffic packet 602 itself.

Continuing to refer to the example embodiment of FIG. 6, the traffic flow 650 is a communication between the source 606 and the destination 604 on the internetwork or plurality of interconnected networks. Every packet in the flow, and in general, will have a source address and a destination address. Each traffic flow 650 will have at least four parameters: (1) a source address for a packet arriving at the NAT device from the external domain will have the address of the device in the external domain 665, (2) a destination address for a packet arriving at the NAT device from the external domain will have the NAT address on the external side 660, (3) a source address of a packet transmitted from the NAT device to the IPv6 device will have the NAT address on the internal side 645, and (4) a destination address of a packet transmitted from the NAT device to the IPv6 device will have the destination address of the device in the internal domain 640 from the internal domain.

In example embodiments of the present invention, the flow 650 is established only once all four address parameters are known, and only one address (i.e., the source address for a packet arriving at the NAT device from the external domain will have the address of the device in the external domain 665) is missing when the flow record is pending; in other words, if less than four addresses are known, the flow is considered to be in a pending state. For instance, when the DNS server, such as the DNS server 161b of FIG. 1B, allocates the external NAT address 660 on the NAT device, that flow remains in a pending state because only three of the four addresses are known. When a traffic packet arrives at the external domain side of the NAT device for a pending flow, that packet can be used to establish or complete the pending flow if that packet does not match any of the existing flows at the external domain NAT address. In other words, the external domain source address of that traffic packet can be used to complete the required quadruplet of addresses, thereby establishing the flow.

In alternative example embodiments of the present invention, the traffic flow 650 can contain additional information 641 or other information as is currently known or future developed relevant to the flow of traffic. When all four addresses (i.e., addresses 665, 660, 645, and 640) are known, the traffic flow 650 is established. Only an established traffic flow 650 can be forwarded to the identified destination.

Further alternative example embodiments may allow for traffic flow to originate at the internal domain of a private network and flow towards an external domain of a public network. In such alternative example embodiments, for a traffic packet emanating from the internal IPv6 device, the source and destination addresses are correspondingly reversed for such outgoing packets. In addition, example embodiments can allow for bidirectional traffic flow between an external domain and an internal domain, where the communications can be initiated by either the external domain or the internal domain.

In alternative example embodiments of the present invention, a network with two different destinations can use the NAT device to communicate with two different destinations in the privately addressed (internal domain) network. In the example embodiments of FIG. 1B and FIG. 3B, the SIPNAT request to a domain name system (DNS) server enables the network address translation that is dependent on the source IP address, and permits establishing two identifiable flows, one per destination. In some example embodiments of the present invention, the use of flow management allows traffic to be transmitted at line rates; and, by employing DPI and SIPNAT, traffic packet delivery can be guaranteed at 100 percent accuracy.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of performing network address translation, the method comprising:
maintaining a record of operation information used by outbound application traffic packets in a flow of a traffic channel for which translation in a network address translation (NAT) device has been initiated, the record including a resource identifier associated with the outbound application traffic packets;
disambiguating, using information in the record, whether a resource identifier of a subsequent outbound application traffic packet is associated with the flow of the traffic channel;
using information in the record for delivering inbound application traffic packets in the flow of the traffic channel to a particular next destination; and
employing an application-specific state machine in the NAT device, the application-specific state machine configured to trace development of an application protocol used by applications to exchange data through the NAT device, in order to observe, record, and use the resource identifier associated with the outbound application traffic packets to determine the particular next destination.

2. The method according to claim 1 further including collecting the resource identifier by parsing traffic flow management algorithms or state machines to monitor progress of a negotiation between at least two peers for establishment of a corresponding resource identifier transmission.

3. The method according to claim 1 further including inspecting a payload of a traffic packet for information that can be uniquely associated with one specific destination for the payload if the flow of the traffic channel has timed out.

4. The method according to claim 1, further including:
isolating and tabulating statistics for certain fields of application protocol messages; and
using at least one statistic to disambiguate a traffic packet with a resource identifier more or most likely to be determined to be associated with the record.

5. The method according to claim 1 further including using deep packet inspection to obtain data from certain fields, to obtain the resource identifier, or both.

6. The method according to claim 1 wherein a public address of the NAT device is within a first address space of a legacy communication protocol and a private address of the NAT device is within a second address space of an updated version of the legacy communication protocol.

7. The method according to claim 6, wherein a public address of the NAT device is an Internet protocol version 4 (IPv4) address and a private address of the NAT device is an Internet protocol version 6 (IPv6) address.

8. The method according to claim 6 wherein the public address and the private address are similar or different network communication protocol addresses.

9. The method according to claim 1 wherein, for resource handling both known to the NAT device and making the resource identifier available, storing the resource identifier as being associated with a destination hosting a corresponding application.

10. The method according to claim 1 further including recording the resource identifier along with an indication about a degree of certainty of correspondence with respective destinations.

11. The method of claim 1 wherein the outbound application traffic packets are consistent with packets from an external domain and the inbound application traffic packets are consistent with packets from an internal domain, the flow of the traffic channel being a communication between the external domain and the internal domain.

12. The method according to claim 1, wherein disambiguating information in the subsequent outbound application traffic packet includes comparing a combination of traffic packet header information and the resource identifier to the information in the record.

13. The method according to claim 1 wherein the resource identifier includes information in payload of the application traffic packets.

14. The method according to claim 1, wherein the method is applied to a BitTorrent protocol or similarly functioning protocol.

15. The method according to claim 1, wherein the method is applied to peer-to-peer communication.

16. The method according to claim 1 further including collecting the resource identifier associated with the outbound application traffic packets by further employing the application-specific state machine in the NAT device to monitor progress of a negotiation between at least two peers, the at least two peers exchanging data through the NAT device, for establishment of a corresponding resource identifier transmission.

17. An apparatus for performing network address translation, the apparatus comprising:
at least one hardware network interface operatively coupled to a maintenance module and a disambiguator module, the at least one hardware network interface configured to receive at least one traffic packet;
the maintenance module configured to maintain a record about a field of the at least one traffic packet received with an incoming payload associated with a flow of a traffic channel in which flow translation in a network address translation (NAT) device has been initialized;
the disambiguator module configured to use at least a subset of the record to disambiguate whether a resource identifier of a subsequent traffic packet is associated with the flow of the traffic channel; and
a collection module configured to employ an application-specific state machine, the application-specific state machine configured to trace development of an application protocol used by applications to exchange data through the apparatus, in order to observe, record, and use the resource identifier associated with the outbound application traffic packets to determine a particular next destination.

18. The apparatus of claim 17 further comprising a delivery module to deliver inbound application traffic packets in the flow of the traffic channel to the particular next destination using information in the record.

19. The apparatus according to claim 17 wherein the disambiguator module is further configured to compare a combination of traffic packet header information and resource identifier to the record.

20. The apparatus according to claim 17, wherein the collection module is further configured to collect the resource identifier by parsing traffic flow management algorithms or state machines to monitor progress of a negotiation between two peers for establishment of a corresponding resource identifier transmission.

21. The apparatus according to claim 17 further comprising an inspector which, if the flow of the traffic channel has timed out, is configured to inspect the payload of traffic packets for information that can be uniquely associated with one specific destination for the payload.

22. The apparatus according to claim 17 further comprising:
a statistics module configured to isolate and tabulate statistics for certain fields of application protocol messages; and
wherein the disambiguator module is further configured to use at least one statistic to disambiguate traffic packets with a resource identifier more or most likely to be determined to be associated with the record.

23. The apparatus according to claim 17 further comprising a deep packet inspection module configured to obtain data from certain fields, to obtain the resource identifier, or both.

24. The apparatus according to claim 17 wherein a public address of the NAT device is within a first address space of a legacy protocol and a private address of the NAT device is within a second address space of an updated version of the legacy protocol.

25. The apparatus according to claim 17 wherein the public address is an IPv4 address and the private address is an IPv6 address.

26. The apparatus according to claim 17 wherein a public address of the NAT device is an IPv4 address and a private address of the NAT device is an IPv4 address.

27. The apparatus according to claim 17 further comprising a storage module which, for resource handling both known to the NAT device and making a resource identifier available, is configured to store the resource identifier as being associated with a destination hosting a corresponding application.

28. The apparatus according to claim 17 further including a recordation module configured to record the resource identifier along with an indication about a degree of certainty of correspondence with respective destinations.

29. The apparatus according to claim 17, wherein the flow of the traffic channel is based on a BitTorrent protocol or similarly functioning protocol.

30. The apparatus according to claim 17, wherein the flow of the traffic channel is based on peer-to-peer communication.

31. A computer program product including a non-transitory computer readable medium having computer readable instructions to perform network address translation, wherein the computer readable instructions, when executed by a processor, cause the processor to:
maintain a record of operation information used by outbound application traffic packets in a flow of a traffic channel for which translation in a network address translation (NAT) device has been initiated, the record including a resource identifier associated with the outbound application traffic packets;
disambiguate, using information in the record, whether a resource identifier of a subsequent outbound application traffic packet is associated with the flow of the traffic channel;
employ an application-specific state machine in the NAT device, the application-specific state machine configured to trace development of an application protocol used by applications to exchange data through the NAT device, in order to observe, record, and use the resource identifier associated with the outbound application traffic packets to determine a particular next destination; and
deliver inbound application traffic packets in the flow of the traffic channel to the particular next destination using information in the record.

32. A method of performing network address translation, the method comprising:
maintaining a record of operation information used by outbound application traffic packets in a flow of a traffic channel for which translation in a network address translation (NAT) device has been initiated, the record including a resource identifier associated with the outbound application traffic packets;
disambiguating, using information in the record, whether a resource identifier of a subsequent outbound application traffic packet is associated with the flow of the traffic channel;
using information in the record for delivering inbound application traffic packets in the flow of the traffic channel to a particular next destination; and
collecting the resource identifier associated with the outbound application traffic packets by employing an application-specific state machine in the NAT device to monitor progress of a negotiation between at least two peers, the at least two peers exchanging data through the NAT device, for establishment of a corresponding resource identifier transmission.

33. An apparatus for performing network address translation, the apparatus comprising:
at least one hardware network interface operatively coupled to a maintenance module and a disambiguator module, the at least one hardware network interface configured to receive at least one traffic packet;
the maintenance module configured to maintain a record about a field of the at least one traffic packet received with an incoming payload associated with a flow of a traffic channel in which flow translation in a network address translation (NAT) device has been initialized;
the disambiguator module configured to use at least a subset of the record to disambiguate whether a resource identifier of a subsequent traffic packet is associated with the flow of the traffic channel; and
a collection module configured to collect the resource identifier associated with the outbound application traffic packets by employing an application-specific state machine in the NAT device to monitor progress of a negotiation between at least two peers, the at least two peers exchanging data through the NAT device, for establishment of a corresponding resource identifier transmission.

34. A computer program product including a non-transitory computer readable medium having computer readable instructions to perform network address translation, wherein the computer readable instructions, when executed by a processor, cause the processor to:
maintain a record of operation information used by outbound application traffic packets in a flow of a traffic channel for which translation in a network address translation (NAT) device has been initiated, the record including a resource identifier associated with the outbound application traffic packets;
disambiguate, using information in the record, whether a resource identifier of a subsequent outbound application traffic packet is associated with the flow of the traffic channel;

collect the resource identifier associated with the outbound application traffic packets by employing an application-specific state machine in the NAT device to monitor progress of a negotiation between at least two peers, the at least two peers exchanging data through the NAT device, for establishment of a corresponding resource identifier transmission; and deliver inbound application traffic packets in the flow of the traffic channel to a particular next destination using information in the record.

\* \* \* \* \*